United States Patent
Bouigeon et al.

(10) Patent No.: US 10,648,778 B2
(45) Date of Patent: May 12, 2020

(54) ARMORED GLAZING MANUFACTURED FROM MASS-PRODUCED LAMINATED GLAZING CONSTITUENTS

(71) Applicant: SAINT-GOBAIN GLASS FRANCE, Courbevoie (FR)

(72) Inventors: Christian Bouigeon, Gien (FR); Pierre Chaussade, Orléans (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 199 days.

(21) Appl. No.: 15/532,611

(22) PCT Filed: Dec. 1, 2015

(86) PCT No.: PCT/FR2015/053274
§ 371 (c)(1),
(2) Date: Jun. 2, 2017

(87) PCT Pub. No.: WO2016/087764
PCT Pub. Date: Jun. 9, 2016

(65) Prior Publication Data
US 2017/0336175 A1   Nov. 23, 2017

(30) Foreign Application Priority Data

Dec. 4, 2014  (FR) ..................... 14 61900

(51) Int. Cl.
*F41H 5/04* (2006.01)
*B32B 17/10* (2006.01)

(52) U.S. Cl.
CPC ..... *F41H 5/0407* (2013.01); *B32B 17/10009* (2013.01); *B32B 17/10045* (2013.01); *B32B 17/1077* (2013.01); *B32B 17/10743* (2013.01); *B32B 17/10761* (2013.01); *B32B 17/10788* (2013.01); *B32B 2250/04* (2013.01); *B32B 2309/105* (2013.01); *B32B 2367/00* (2013.01); *B32B 2369/00* (2013.01); *B32B 2571/02* (2013.01)

(58) Field of Classification Search
CPC ..................................................... F41H 5/0407
See application file for complete search history.

(56) References Cited

U.S. PATENT DOCUMENTS

| 4,265,650 | A | * | 5/1981 | Reese | ................. C03B 23/0302 65/104 |
| 4,696,713 | A | * | 9/1987 | Okafuji | ............. B32B 17/10862 156/358 |
| 4,908,083 | A | * | 3/1990 | Hall | .................. B32B 17/10018 156/99 |
| 2009/0311497 | A1 | | 12/2009 | Aoki | |
| 2013/0302581 | A1 | | 11/2013 | Mannheim et al. | |
| 2013/0312594 | A1 | | 11/2013 | Bertolini | |
| 2018/0194664 | A1 | * | 7/2018 | Balduin | ................ C03B 35/147 |

FOREIGN PATENT DOCUMENTS

| DE | 20 2009 009 173 U1 | 12/2010 |
| FR | 2 632 950 A1 | 12/1989 |
| FR | 2 676 049 A1 | 11/1992 |
| WO | WO 2014/022663 A1 | 2/2014 |

OTHER PUBLICATIONS

International Search Report as issued in International Patent Application No. PCT/FR2015/053274, dated Mar. 16, 2016.

* cited by examiner

*Primary Examiner* — Reginald S Tillman, Jr.
(74) *Attorney, Agent, or Firm* — Pillsbury Winthrop Shaw Pittman LLP

(57) ABSTRACT

A process for manufacturing a light armored curved laminated glazing intended to be fitted in an opening of a transport vehicle suitable for the mass-production fitting of a curved laminated glazing containing two glass sheets, wherein use is made of at least three constituent curved glass sheets of such mass-produced curved laminated glazing containing two glass sheets, including both sheets from one and the same such mass-produced curved laminated glazing containing two glass sheets, which have been previously bent together.

14 Claims, No Drawings

ARMORED GLAZING MANUFACTURED FROM MASS-PRODUCED LAMINATED GLAZING CONSTITUENTS

CROSS-REFERENCE TO RELATED APPLICATIONS

This application is the U.S. National Stage of PCT/FR2015/053274, filed Dec. 1, 2015, which in turn claims priority to French patent application number 1461900 filed Dec. 4, 2014. The content of these applications are incorporated herein by reference in their entireties.

The invention relates to the manufacture of light armored laminated glazings, intended to protect against perforation by .22 Long Rifle bullets, or penetration using a baton or the like. Advantageously, these light armored glazings can be fitted to the body opening of a transport vehicle without modifying anything, i.e. can be fitted to a mass-produced body.

Currently, these glazings are manufactured in dedicated facilities, in amounts incomparably smaller than those of mass production. The glass sheets forming such a glazing are bent together, i.e. especially in groups of four to eight glass sheets, by gravity. One-pot furnaces or batch furnaces are used. The glass sheets are at a static station, it is the tools that come to them. The manufacturing times are relatively long, since obtaining the required optical quality and geometric accuracy requires extensive adjustments. Before obtaining the required stability of properties of the glazings, many articles must be scrapped.

The invention was therefore motivated by the concern for producing light armored glazings for transport vehicles such as mass-produced motor vehicles, without modification of their body. The invention also targets shorter manufacturing times, an improvement in the optical quality of the glazings produced and in their geometric compatibility with the frame in which they are intended to be installed.

For this purpose, one subject of the invention is a process for manufacturing a light armored curved laminated glazing intended to be fitted in an opening of a transport vehicle suitable for the mass-production fitting of a curved laminated glazing containing two glass sheets, characterized in that use is made of at least three constituent curved glass sheets of such mass-produced curved laminated glazing containing two glass sheets, including both sheets from one and the same such mass-produced curved laminated glazing containing two glass sheets, which have been previously bent together. As will be seen in greater detail subsequently, the two glass sheets of a mass-produced curved laminated glazing often differ from one another due to their composition (one may be tinted, and the other clear), the layers or screen-printed patterns that they bear and their thickness, thus reference will be made subsequently, according to common usage, to the inner glass sheet which is the one intended to be oriented toward the passenger compartment of the vehicle, and to the outer sheet which is the one intended to be oriented toward the external atmosphere. The two sheets of mineral glass of a mass-produced curved laminated glazing are bent together by gravity so that the curvature over their entire surface is exactly identical, even if the inner sheet and outer sheet have a slightly different geometry from one another so that they are not interchangeable.

The invention makes it possible to obtain the desired protection against a .22 Long Rifle shot or the like, against attacks and penetrations, and also a required optical and geometric quality of the laminated glazing, which are improved relative to those obtained in the current small-scale productions. The number of glass sheets scrapped is itself also much lower.

Mass-produced curved laminated glazings containing two glass sheets, such as motor vehicle windshields, have the most constant geometry possible of their periphery, guaranteeing a perfect adaptation to the body opening into which they are installed, both as regards the contour of their periphery and the angle formed by their edge surface. Thus, an excellent coupling accuracy is obtained. Furthermore, according to the process of the invention, the glazing obtained may be fitted in the body opening, in particular via the outside, and/or the inner face of the glazing may bear against the frame of the opening, in the same way as a mass-produced laminated windshield containing two glass sheets.

This intrinsic maximum reproducibility of mass production is also a guarantee of an optimal optical quality of the laminated glazing, and of a considerable cost reduction making, within the context of the invention, a light armored glazing available to the greatest number of people.

In accordance with preferred features of the process of the invention:
  use is made of at least four constituent glass sheets of said mass-produced laminated glazing containing two glass sheets;
  use is made of at most six constituent glass sheets of said mass-produced laminated glazing containing two glass sheets.

In a first main variant of the process of the invention, joined to the two glass sheets forming said one and the same mass-produced curved laminated glazing, on the side of the outer sheet thereof, is at least one outer glass sheet intended for another mass-produced curved laminated glazing containing two glass sheets, and/or on the side of its inner sheet, is at least one inner glass sheet intended for another mass-produced curved laminated glazing containing two glass sheets. The expression "intended for" refers here and subsequently to the fact that the glass sheet was bent by gravity with its "twin" glass sheet so as to match the curvature thereof as closely as possible over its entire surface, as mentioned above.

A light armored laminated glazing according to this first main variant will therefore be manufactured by joining to the inner glass sheet and the outer glass sheet of a first mass-produced curved laminate:
  on the side of this inner glass sheet, the inner glass sheet of one or more other mass-produced curved laminate(s), and/or
  on the side of this outer glass sheet, the outer glass sheet of one or more other mass-produced curved laminate(s).

When use is made simultaneously of at least one inner glass sheet of one said other mass-produced curved laminate and at least one outer glass sheet of one said other mass-produced curved laminate, it is not excluded for these to be intended for one and the same other mass-produced laminate (and for them to have, in particular, been bent together).

In a second main variant of the process of the invention, joined to the two glass sheets forming said one and the same mass-produced curved laminated glazing, on one side or the other thereof, are the two glass sheets, in adjacent position, of at least one other mass-produced curved laminated glazing containing two glass sheets. The two glass sheets of the at least two mass-produced curved laminated glazings are in adjacent position; having been bent together in pairs by gravity, their surfaces have exactly the same curvature. As regards the curvature, which may differ very slightly from one mass-produced curved laminate containing two glass sheets to the next, this difference in no way prevents lamination with any conventional interlayer adhesive of polyvinyl butyral, ethylene-vinyl acetate or ionomer resin type. The glass sheets may be joined in a state already laminated by two sheets of one at least of the mass-produced curved laminates, which is then optionally heated in order to be joined to the other glass sheets, or before laminating all these mass-produced curved laminates containing two glass sheets.

These first and second main variants of the process of the invention may be carried out simultaneously.

Another subject of the invention is a light armored laminated glazing manufactured according to the process described above, in which the glass sheets which form it have a thickness of between 1 and 4 mm, preferably at least equal to 1.3 mm and at most equal to 3.2 mm.

The glass sheets of this glazing are bonded to one another by an interlayer adhesive. This may be polyvinyl butyral (PVB) in thicknesses of 0.76 mm or half this thickness or combinations of multiples of these thicknesses depending on the ballistic requirements and/or depending on the requirements for good lamination, stretched to a thickness approximately of 0.6 mm, ethylene-vinyl acetate (EVA), or a resin such as ionomer resin, without this list being limiting. The interlayer adhesive may provide an increased penetration and/or ballistic resistance, and also other functionalities such as acoustic insulation.

According to a first preferred variant of the light armored glazing of the invention, its face opposite the one where an impact is likely to occur is shatterproof due to the fact that it consists of a polycarbonate sheet having a thickness of between 1.8 and 4, preferably 2.2 and 3.3 mm, which is bonded to a glass sheet by a layer of polyurethane.

According to a second preferred variant of the light armored glazing of the invention, its face intended to be oriented toward the inside of the passenger compartment is shatterproof due to the fact that it consists of a polyethylene terephthalate sheet provided with a polysiloxane-type scratch-resistant and/or functional coating (for example anti-condensation or anti-fogging coating rendered thus by functionalization of the polysiloxane by hydrophilic functions) and bonded to a glass sheet by a layer of polyurethane or polyvinyl butyral.

Another subject of the invention consists of the application of a curved laminated glazing described above as a motor vehicle windshield, in particular as a light police vehicle or truck windshield. This curved laminated glazing is bulletproof and resistant to penetration by a baseball bat or equivalent, while remaining light.

The invention will now be better understood in light of the following exemplary embodiments.

EXAMPLE 1

A light armored windshield is manufactured from clear soda-lime float glass sheets bent in pairs with a view to forming mass-produced laminated windshields containing two glass sheets. The inner glass sheets have a thickness of 1.6 mm, the outer glass sheets have a thickness of 2.1 mm.

The inner face of the inner glass sheets, referred to as face 4 in the laminates containing two glass sheets, face 1 being the one in contact with the external atmosphere, bears a screenprinting annealed in the bending furnace.

Assembled, from the inside toward the outside of the laminate, are the inner glass sheet and the outer glass sheet that are intended for a first mass-produced windshield containing two glass sheets, the outer glass sheet intended for a second mass-produced windshield containing two glass sheets, then the outer glass sheet intended for a third mass-produced windshield containing two glass sheets. The glass sheets are bonded in pairs by a sheet of stretched polyvinyl butyral having a thickness of 0.6 mm.

According to a first variant, a 2.5 mm sheet of polycarbonate (PC) is bonded to the inner face of said inner glass sheet by means of a 1.9 mm thick layer of polyurethane.

According to a second variant, a complex consisting of a 0.38 mm, respectively 0.76 mm, sheet of plasticized PVB and of a 0.18 mm sheet of polyethylene terephthalate (PET) coated with a layer of polysiloxane, sold by the company DUPONT DE NEMOURS under the registered trademark Spallshield® SG2—157, respectively—307, is bonded to the inner face of said inner glass sheet.

EXAMPLE 2

A light armored windshield is manufactured from soda-lime float glass sheets bent in pairs with a view to forming mass-produced laminated windshields containing two glass sheets. The inner glass sheets have a thickness of 1.4 mm, the outer glass sheets have a thickness of 1.6 mm.

The inner glass sheets are clear, the outer glass sheets are tinted and their inner face, referred to as face 2 in the laminates containing two glass sheets, bears a screenprinting that has in particular the function of hiding an underlying electrical connection and/or the peripheral ablation or demargination of thin layers on the outer face of the inner glass sheets, for example.

Assembled in this example, this time from the outside toward the inside of the laminate, are the outer glass sheet and the inner glass sheet that are intended for a first mass-produced windshield containing two glass sheets, then successively the inner glass sheet intended for a second, a third, a fourth then a fifth mass-produced windshield containing two glass sheets.

The same adhesive interlayer is used between two glass sheets as in the preceding example, and the same shatterproof partial laminate consisting of the polyurethane layer and of the polycarbonate sheet is assembled on the inner face of the partial laminate consisting of all the glass sheets bonded to one another.

It is possible to use acoustic PVB in order to bond certain glass sheets together, or all the glass sheets, or else to replace one or more PVB layer(s) with a high mechanical performance resin, in particular an ionomer resin sold by the company DuPont de Nemours under the registered trademark SentryGlas® Plus, in a thickness of 0.89, 1.52 or 2.28 mm in particular. The relative thinness of the glass sheets of the curved laminated glazing of the invention is particularly well suited to the use of this ionomer resin, the cooling of which is thus accelerated with respect to that which occurs with thicker glass sheets.

It is also possible to use several pairs of thicknesses of outer sheets, respectively inner sheets, of mass-produced laminates containing two glass sheets, inter alia:
2.1, respectively 2.1 mm;
2.6, respectively 2.1 mm, in particular.

EXAMPLE 3

Example 1 is reproduced, apart from the difference that the glass portion consists exclusively of two mass-produced curved laminated glazings containing two glass sheets, which are heated before being laminated together, and that all the interlayer adhesives consist of a 0.89 mm layer of an ionomer resin sold by the company DuPont de Nemours under the registered trademark SentryGlas® Plus.

The glazings from examples 1 to 3 have a desired functionality of ballistic protection and protection with respect to penetration. With respect to small-scale productions, shorter manufacturing times, an improvement in the optical quality of the glazing, in the stability, the accuracy of its geometry, and therefore in its adaptation to the body opening into which it is intended to be installed, are obtained.

The invention claimed is:

1. A process for manufacturing a light armored curved laminated glazing to be fitted in an opening of a transport vehicle, the method comprising:
    selecting a first pair of curved glass sheets from a group of mass-produced pairs of curved glass sheets for manufacturing curved laminated glazings that each contain two glass sheets;
    selecting at least one curved glass sheet from a second pair of curved glass sheets from the group of mass-produced pairs of curved glass sheets for manufacturing curved laminated glazings that each contain two glass sheets, wherein the curved glass sheets in the first pair of curved glass sheets have been previously bent together, and wherein the curved glass sheets in the second pair of curved glass sheets have been previously bent together and separately from the curved glass sheets of the first pair of curved glass sheets, and
    assembling together the first pair of curved glass sheets with the at least one curved glass sheet of the second pair of curved glass sheets.

2. The process as claimed in claim 1, wherein the assembling comprises assembling together the first pair of curved glass sheets with both curved glass sheets of the second pair of curved glass sheets.

3. The process as claimed in claim 1, further comprising selecting at least one curved glass sheet from a third pair of curved glass sheets from the group of mass-produced pairs of curved glass sheets for manufacturing curved laminated glazings that each contain two glass sheets, wherein the curved glass sheets in the third pair of curved glass sheets have been previously bent together and separately from the curved glass sheets of the first pair of curved glass sheets and separately from the curved glass sheets of the second pair of curved glass sheets and wherein the assembling comprises assembling together the first pair of curved glass sheets with both curved glass sheets of the second pair of curved glass sheets and with the at least one curved glass sheet of the third pair of curved glass sheets.

4. The process as claimed in claim 3, wherein the assembling comprises assembling together the first pair of curved glass sheets with both curved glass sheets of the second pair of curved glass sheets and with both curved glass sheets of the third pair of curved glass sheets.

5. The process as claimed in claim 1, wherein each of the curved glass sheets from the group of mass-produced pairs of curved glass sheets has a thickness of between 1 and 4 mm.

6. The process as claimed in claim 1, wherein each of the curved glass sheets of the first pair of curved glass sheets and the at least one curved glass sheet from the second pair of curved glass sheets have a thickness between 1 and 4 mm.

7. The process as claimed in claim 1, wherein each of the curved glass sheets of the first pair of curved glass sheets and the at least one curved glass sheet from the second pair of curved glass sheets have a thickness between 1 mm and 3.2 mm.

8. The process as claimed in claim 1, wherein the curved glass sheets which form the light armored curved laminated glazing are bonded to one another by an interlayer adhesive.

9. The process as claimed in claim 8, wherein the interlayer adhesive is a layer selected from the group consisting of a polyvinyl butyral layer, an ethylene-vinyl acetate layer and an ionomer resin layer.

10. The process as claimed in claim 9, wherein the interlayer adhesive is the ionomer resin layer.

11. The process as claimed in claim 1, wherein a face of the light armored curved laminated glazing intended to be oriented toward an inside of a passenger compartment of the transport vehicle consists of a polycarbonate sheet having a thickness of between 1.8 and 4 mm, which is bonded to a glass sheet by a layer of polyurethane.

12. The process as claimed in claim 11, wherein the thickness is between 2.2 and 3.3 mm.

13. The process as claimed in claim 1, wherein a face of the light armored curved laminated glazing intended to be oriented toward an inside of a passenger compartment of the transport vehicle consists of a polyethylene terephthalate sheet provided with a scratch-resistant and/or functional coating and bonded to a glass sheet by a layer of polyurethane or polyvinyl butyral.

14. The process as claimed in claim 1, wherein the transport vehicle is a police vehicle or a truck.

* * * * *